Dec. 7, 1943.   J. MIHALYI   2,336,279
ROLL HOLDING CAMERA
Filed June 19, 1942
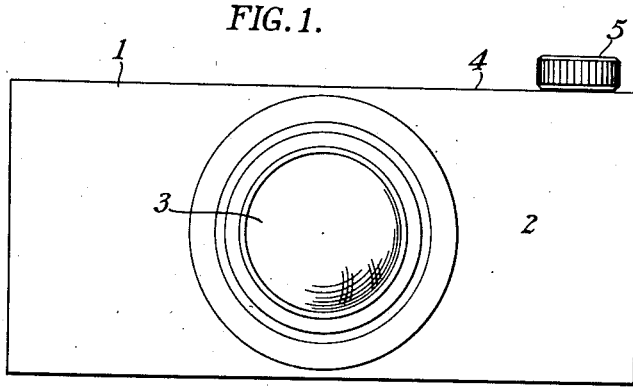
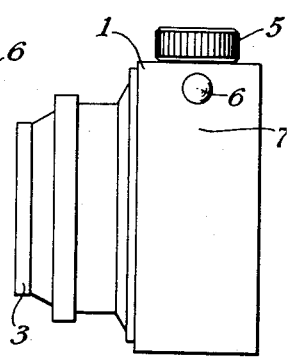
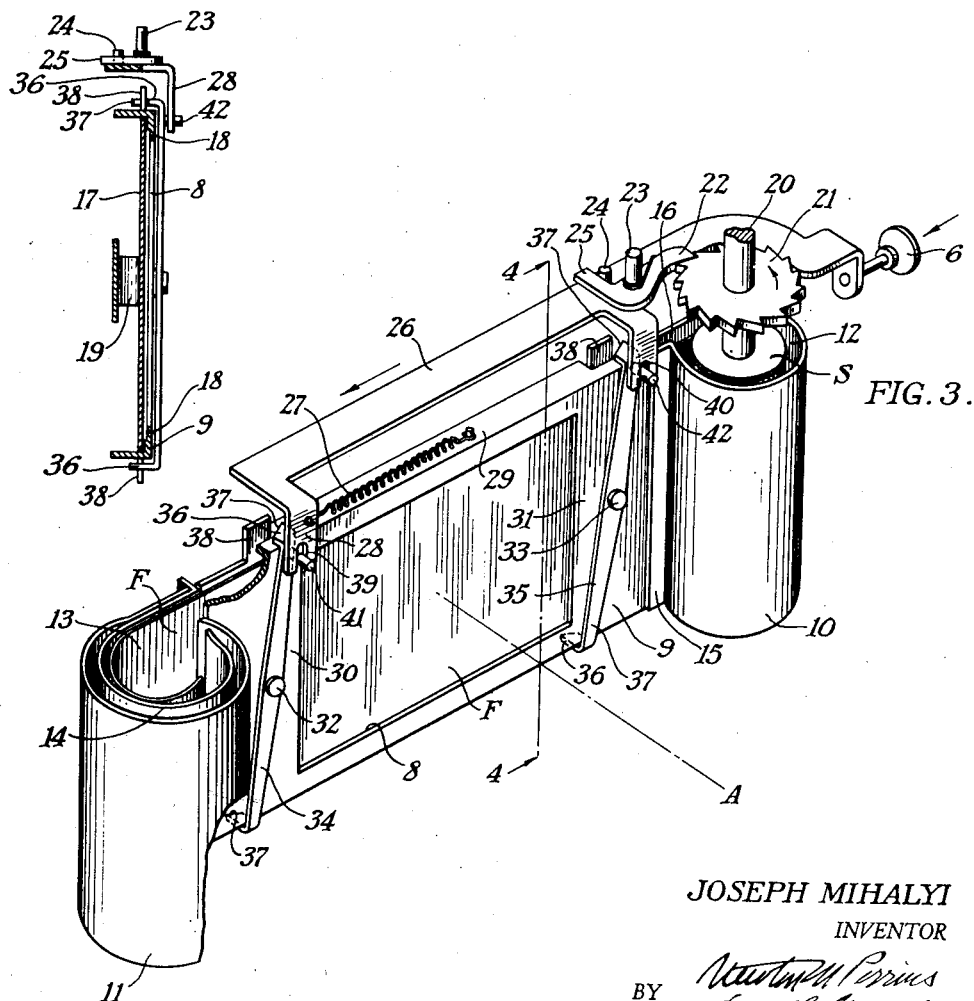
JOSEPH MIHALYI
INVENTOR
BY
ATTORNEYS Patented Dec. 7, 1943.

2,336,279

UNITED STATES PATENT OFFICE 2,336,279

ROLL HOLDING CAMERA

Joseph Mihalyi, Rochester, N. Y., assignor to Eastman Kodak Company, Rochester, N. Y., a corporation of New Jersey Application June 19, 1942, Serial No. 447,649

4 Claims. (Cl. 95—31)

This invention relates to photography and more particularly to roll film cameras. One object of my invention is to provide a camera with an improved film winding and rewinding mechanism. Another object of my invention is to provide a camera in which a single film spool may be used and in which the film is unwound from and rewound on the original film spool. Another object of my invention is to provide a camera for film of the type described in which means is provided for guiding film across an exposure frame for moving the film in one direction and in which means are provided for holding the film flat on an exposure frame when film is exposed.

In most roll film cameras of known type the cameras are provided with two film chambers, each of which supports a film spool, and film is wound from one spool to the other and is exposed between the winding operations. Such cameras are easy to operate after loading the film into place but unfortunately it is necessary to thread the film properly between the two film spools and pass it with some degree of accuracy through the proper path, and if any of these operations are not properly performed the film may bind or may not pass freely through the camera.

In the second known type of camera the film is unwound from one film spool onto a second film spool which is usually permanently mounted on the camera, but which may turn thereon, so that after film is wound in one direction onto this spool it is returned to the original spool before it is removed for development.

A still more recent type of camera has been suggested in which a spool of film is inserted in one film spool chamber from which it is propelled in a second film spool chamber and then is drawn back upon the original spool making the exposures as the film is moved. This type of camera has the big advantage over the first two mentioned known types in that it permits the film to be much more rapidly loaded and unloaded and does not in any way complicate the operation of threading the camera because this operation can be performed automatically. My present invention relates to cameras of this last-mentioned type and particularly relates to an improved form of film channel through which the film can be propelled after loading a spool into the camera, this channel being more or less closed by a presser member when the film is passing through the channel and through exposure positions in which it lies against an exposure frame. I have made this structure relatively foolproof by providing a mechanism so designed that the channel can only be opened for loading film and will be automatically spring-pressed closed during the time that the film is being exposed.

Coming now to the drawing wherein like reference characters denote like parts throughout:

Fig. 1 is a front plan view of a typical camera constructed in accordance with a preferred embodiment of my invention;

Fig. 2 is an end elevation of the camera shown in Fig. 1;

Fig. 3 is a perspective view of a portion of the camera structure removed from the camera body; and Fig. 4 is a section taken on line 4—4 of Fig. 1.

My invention may be applied to almost any type of roll film camera. It consists broadly of a camera body 1 having on the front wall 2 a camera objective 3 and carrying on the top wall 4 a winding key 5. A push button 6 may extend through an end wall 7 for a purpose which will be hereinafter more fully described.

Referring to Fig. 3, wherein part of the camera mechanism is shown, there is an exposure frame 8 preferably located on the axis A of the objective 3. An exposure frame is merely a rectangular frame cut out of a metal plate 9, the ends of which 10 and 11 are rolled up to form a supply spool chamber 12 and a temporary take-up chamber 13. The latter may be equipped with a leaf spring 14 to assist a film F in coiling into a loose coil when this film is propelled through the film channel between the two plates 15 and 16 of the supply chamber 12, this channel extending behind the exposure frame 8. The channel also extends between the presser plate 17 and the exposure frame 8 and then into the temporary take-up chamber 13.

As indicated in Fig. 4, the exposure frame 8 is formed from the metal plate 9 and it is preferably provided with longitudinal rabbets 18 so as to support the lateral edges of a film F and prevent scratching the surface of the film.

When the parts are shown in the position indicated in Fig. 4 one or more leaf springs 19 may thrust the film presser plate 17 forwardly into the position shown in which it presses a film F flat against the exposure frame 8. Thus, when the film is being wound from chamber 13 to chamber 12 by turning the knob 5 the shaft 20 is also turned in a clockwise direction to turn the film spool S to pull the film F across the exposure frame 8 while it is being held flat thereon by the presser member 17. During the film exposing operations, the shaft 20 can only be turned in a clockwise direction because of a ratchet 21 carried by the shaft 20 which is engaged by a pawl 22 spring pressed against the ratchet and pivoted on the stud 23. A stop pin 24 limits the movement of the pawl by contacting with the pawl arm 25.

After a film has been completely exposed and wound on the spool S, it may be removed from the camera and a fresh roll inserted. It is then desirable to open up the film channel leading to the chamber 13 to propel film into this chamber. This may be done by pressing on the push button 6, moving the slide bar 26 in the direction shown by the arrow in Fig. 3 against the pressure of a spring 27 connected to the arm 28 of the slide 26 and to a portion 29 of the exposure frame. This pressure not only causes the pin 24 to engage the arm 25 releasing the pawl 22 from the ratchet 21 but it accomplishes the additional function of opening up the film channel.

This is done in the following manner. On each end 30 and 31 of the exposure frame there is pivoted at 32 and 33 similar cam levers 34 and 35. Each cam lever carries a similar turned over end 36 terminating in a cam face 37, and since all of these are the same, the same reference characters have been applied to them. Each of these cams is positioned to engage an upstanding lug 38 which may be formed integrally with the presser member 17 so that, when the forks 39 and 40 carried by the slide 26 swing the pins 41 and 42 carried by the levers 34 and 35 about their respective pivots, the presser plate is moved backwardly against the leaf spring 19 so that a channel of a width considerably greater than the thickness of the film is provided. This channel is wide and forms a guideway for the end of the film F as it is turned into the channel by turning the knob 5 in a counter-clockwise direction. This winding movement may be continued until the knob comes to a stop which occurs when the end of the film is reached, since the end of the film is attached to the shaft 20 or to the shaft of a spool which is attached to the shaft 20.

The operator then releases the push button 6 and the spring 27 drives the slide 26 in a direction opposite to that shown by the arrow in Fig. 3 simultaneously rocking the cam levers 34 and 35 to release the presser lugs 38. This allows the spring 19 to thrust the presser member against the film, thereby holding the film flat on the rabbets 18 of the exposure frame. At the same time movement of the slide 26 as described brings the pawl 22 into engagement with the ratchet 21. This definitely prevents the knob 5 from being turned in a film unwinding direction, such as is used in moving the film to the film spool chamber 13. The film must, therefore, be wound by turning the knob 5 in a clockwise direction to return the film to the original spool 21, this winding being accomplished intermittently since exposures are made as the film is wound one exposure at a time past the exposure frame 8.

Any desired or known type of exposure indicating means may be used and, although it is not necessary, film backing paper may be used so that if desired the exposure numbers may be viewed in a known manner through a non-actinic window in the back of a camera.

The operation of unwinding film from a single spool into a loose coil in a film chamber and returning it to the original supply spool chamber is extremely simple, since the channel for the film is automatically held open as long as the push button 6 is pressed inwardly and it is necessary to press the push button 6 inwardly in order to turn the film winding knob in the counterclockwise winding direction. The film channel is automatically closed by means of the spring 27 and the pawl and ratchet are reengaged just as soon as the push button 6 is released. Thus, if an operator should thoughtlessly endeavor to turn the knob 5 in the wrong direction, this could not be accomplished.

I claim:

1. In a photographic camera, the combination with a camera body, of an exposure frame therein, a presser member mounted behind the exposure frame and movable relative thereto from an operative position in which film may be pressed against the exposure frame to an inoperative position in which it is spaced therefrom to form a film channel therebetween, a film winding shaft, a one way clutch thereon, mechanism for releasing said clutch and moving the film presser member to a position spaced from the exposure frame including a slidable member, a pair of pivotally mounted cam levers carried by the exposure frame and connections between the cam levers and slidable member for operating the latter from the former, said cam levers having a position in which the presser member is cammed from the exposure frame.

2. In a photographic camera, the combination with a camera body, of an exposure frame therein, a presser member mounted behind the exposure frame and movable relative thereto from an operative position in which film may be pressed against the exposure frame to an inoperative position in which it is spaced therefrom to form a film channel therebetween, a film winding shaft, a one way clutch thereon, mechanism for releasing said clutch and moving the film presser member to a position spaced from the exposure frame including a slidable member, a pair of pivotally mounted cam levers carried by the exposure frame and connections between the cam levers and slidable member for operating the latter from the former, said cam levers having a position in which the presser member is cammed from the exposure frame, said slidable member including a part of the one way clutch whereby movement of the slidable member may release said one way clutch.

3. In a photographic camera, the combination with a camera body, of an exposure frame therein, a presser member mounted behind the exposure frame and movable relative thereto from an operative position in which film may be pressed against the exposure frame to an inoperative position in which it is spaced therefrom to form a film channel therebetween, a film winding shaft, a one way clutch thereon, mechanism for releasing said clutch and moving the film presser member to a position spaced from the exposure frame including a slidable member, a pair of pivotally mounted cam levers carried by the exposure frame and connections between the cam levers and slidable member for operating the latter from the former, said cam levers having a position in which the presser member is cammed from the exposure frame, said slidable member including a part of the one way clutch whereby movement of the slidable member may release said one way clutch, and a knob carried by the slidable member and extending to the outside of the camera body for manually moving the slidable member.

4. In a photographic camera, the combination with a camera body, of an exposure frame therein, a presser member mounted behind the exposure frame and movable relative thereto from an operative position in which film may be pressed against the exposure frame to an inoperative position in which it is spaced therefrom to form a film channel therebetween, a film winding shaft, a one way clutch thereon, mechanism for releasing said clutch and moving the film presser member to a position spaced from the exposure frame including a slidable member, a pair of pivotally mounted cam levers carried by the exposure frame and connections between the cam levers and slidable member for operating the latter from the former, said cam levers having a position in which the presser member is cammed from the exposure frame, said slidable member including a part of the one way clutch whereby movement of the slidable member may release said one way clutch, a spring for holding the slidable member in one position, and a knob carried by the slidable member and extending outside the camera for moving the slidable member against spring pressure.

JOSEPH MIHALYI.